United States Patent [19]

Peterson

[11] Patent Number: 4,719,513
[45] Date of Patent: Jan. 12, 1988

[54] COMPACT VIDEO SYSTEM

[75] Inventor: Dean M. Peterson, Escondido, Calif.

[73] Assignee: Eastman Kodak Company, Rochester, N.Y.

[21] Appl. No.: 947,324

[22] Filed: Dec. 29, 1986

[51] Int. Cl.$^4$ .................... H04N 5/655; H04N 5/74
[52] U.S. Cl. .................................... 358/254; 358/252; 358/237; 312/114
[58] Field of Search ............... 358/254, 252, 255, 229, 358/231, 237, 93, 60, 64; 312/7.2, 114, 117, 260

[56] References Cited

U.S. PATENT DOCUMENTS 4,576,578 3/1986 Parker .................................. 358/254

FOREIGN PATENT DOCUMENTS 1487451 5/1967 France .................................. 358/254
979708 5/1961 United Kingdom ................ 358/254

OTHER PUBLICATIONS

Spin Physics (Kodak) Brochure "Motion Analysis Moves into the 80's" (1984).

Primary Examiner—Tommy P. Chin
Attorney, Agent, or Firm—William F. Noval

[57] ABSTRACT

A compact video system includes a collapsible cart for housing the components of a video system which is usable outdoors to record athletic events and the like. A wheeled lower housing supports an upper housing by adjustable arms. When the upper housing is collapsed against the lower housing, a brake is actuated to lock the wheels to prevent easy removal of the cart and theft of components housed in the lower housing. Housed in the upper housing is a video monitor which has an upwardly oriented tube face. The monitor face is viewed by a mirror and glare screen which are operatively associated with a lid which covers the monitor when closed. When the lid is opened, the video monitor may be viewed in bright sunlight without a substantial loss of image brightness.

4 Claims, 5 Drawing Figures

COMPACT VIDEO SYSTEM

BACKGROUND OF THE INVENTION

This invention relates to a compact video system for the recording of high speed events. More particularly, the present invention relates to a video system for use outdoors to record rapidly changing events such as athletic events. The video system is self-contained, has a collapsible cart which houses the components of the system for protection from environmental effects and theft, and has a video monitor which may be viewed in sunlight without loss of image brightness.

The need often arises for recording high speed or rapidly changing events so that the event may be played back later in slow or stopped motion in order to analyze the event. Such motion analysis capabilites are, for example, desirable in analyzing athletic events such as the motions of an athlete while engaged in football, baseball, golfing, or the like. Thus, it may be desirable to capture the motion of a swinging golf club in order to correct a defect in the golfer's swing. Stop action may be used in football games in order to analyze the movements of a football player, such as those of a quarterback throwing a football to a receiver. Motion analysis systems are also useful in determining the overall athletic prowess of an athlete by determining how fast the athlete can run a forty-yard dash, for example.

In addition to applications to athletic events, motion analysis is also useful in examining the operation and fault pattern of machinery, in crash testing of transportation systems, in testing of aerospace hardware and the like.

In such applications, it is desirable that the components of the motion analysis video system be protected from harsh environment and theft of the expensive components of the video system, while providing easy transportation of the system to the site of the event to be analyzed. It is also desirable that such a video system be totally self-contained and provide easily accessible storage for the components of the analysis system. Since the video system is used outdoors or in other bright light situations, images displayed on a video monitor produced by a VCR or camera should be viewable without a substantial loss of brightness.

SUMMARY OF THE INVENTION

According to the present invention, there is provided a compact video system which is transportable, which protects the components of the system from harsh environment and from theft and which may be used outdoors to display bright images which are viewable despite bright sunlight and incident glare. According to an aspect of the invention, the compact video system includes a collapsible cart having upper and lower housings which house the components of the video system and which protect them from harsh environmental effects such as snow, rain or the like. The upper housing is collapsible against the lower housing and automatically actuates a brake to lock wheels mounted on the lower housing to prevent unauthorized movement of the video apparatus. According to an aspect of the invention, the upper housing includes a video monitor which is viewable by means of a mirror and glare screen so that an image on the monitor can be viewed in bright sunlight without a substantial loss of brightness.

BRIEF DESCRIPTION OF THE DRAWINGS

In the following description of the drawings, like elements are numbered with like numbers.

DECRIPTION OF THE PREFERRED EMBODIMENT

Figure 1:
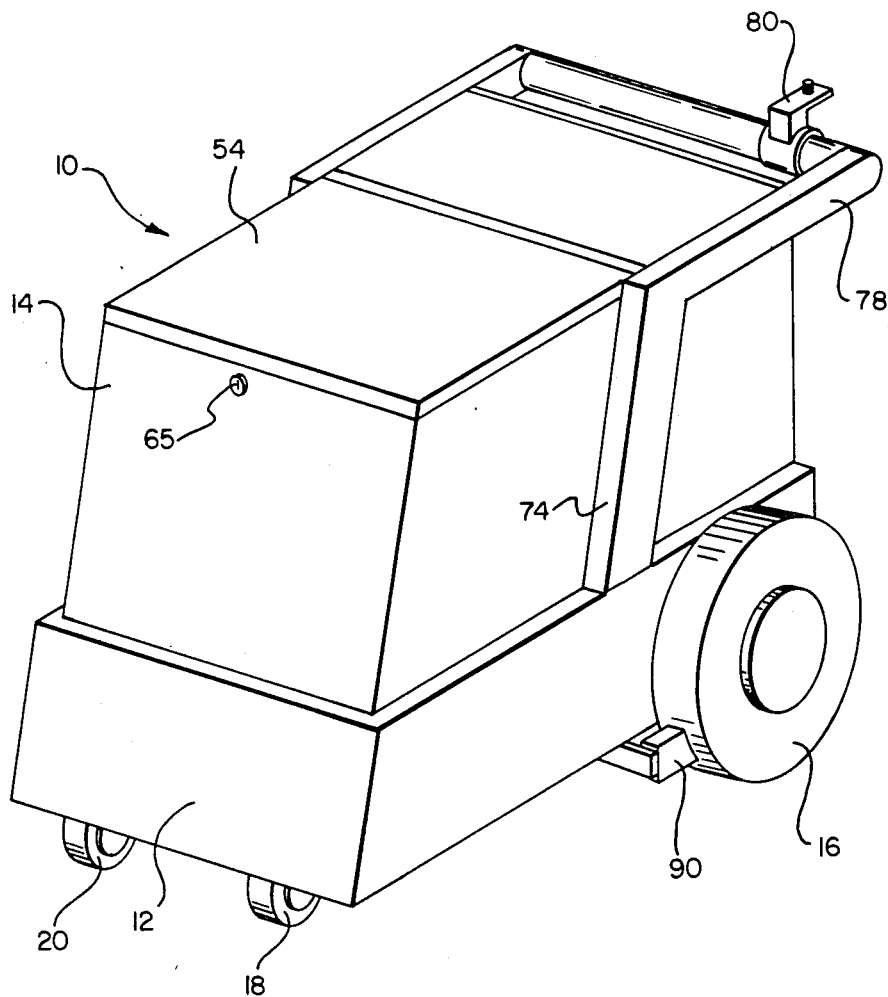
FIGS. 1 and 2 are respectively perspective views of an embodiment of the present invention it in a collapsed position and in a raised position.
Figure 2:
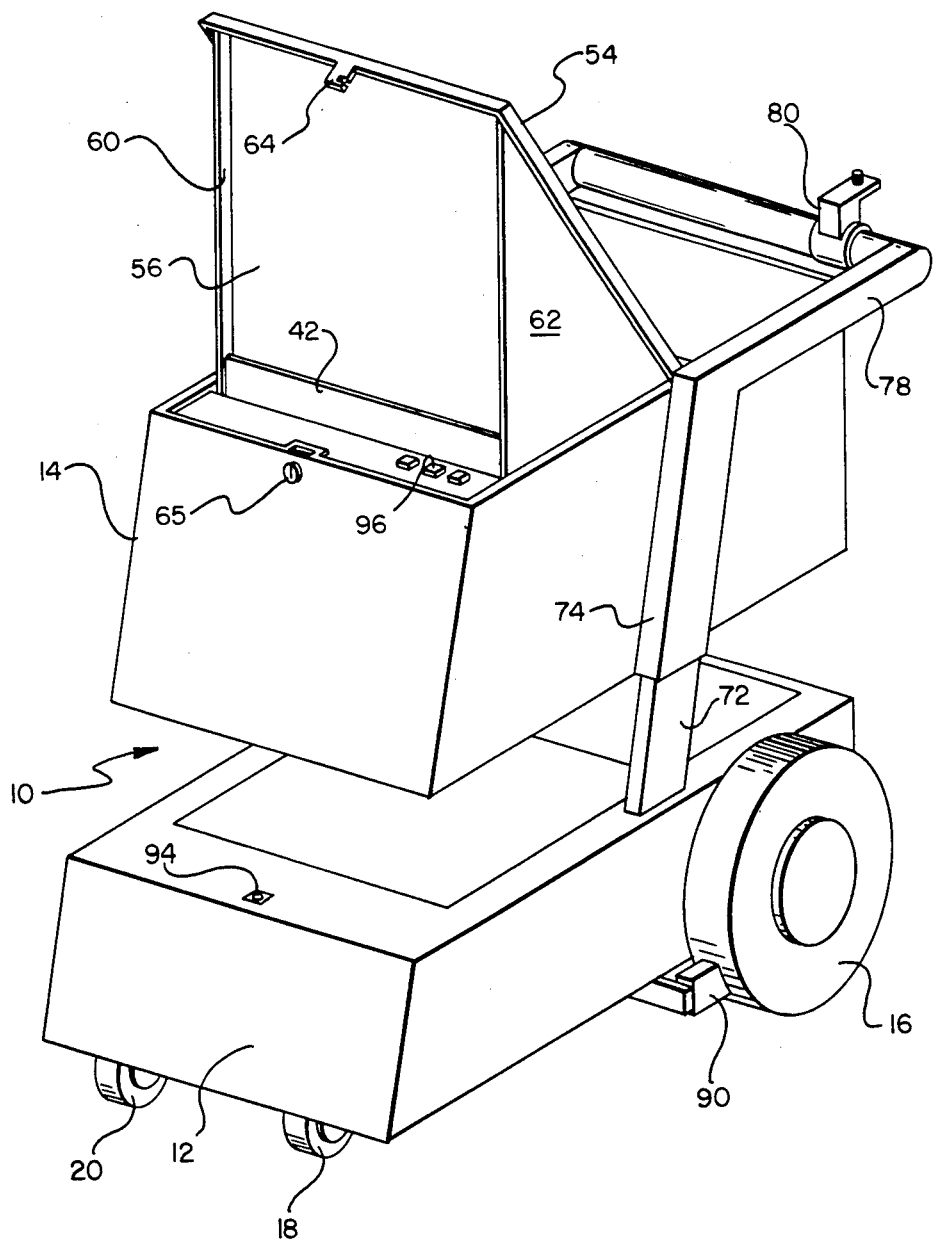
Figure 3:
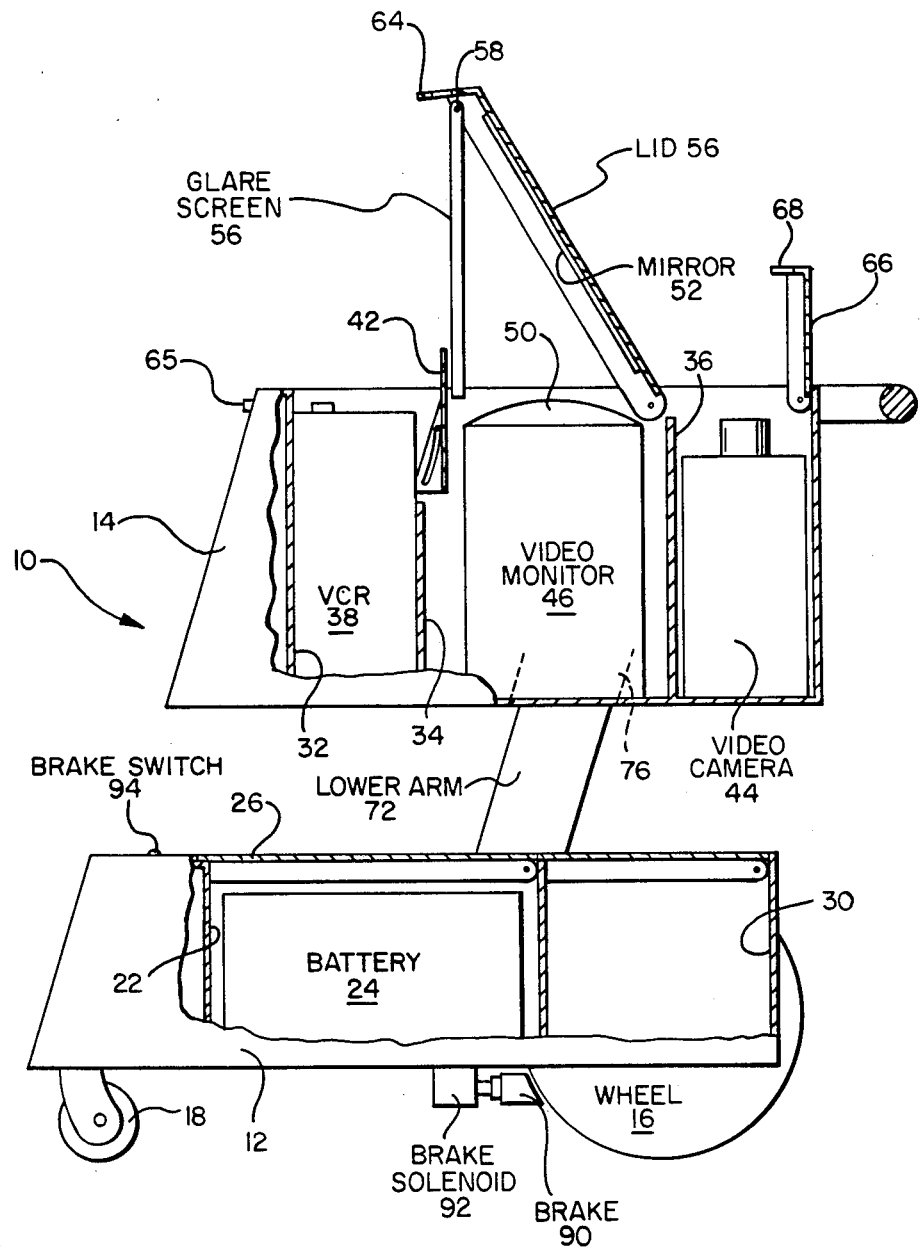
FIG. 3 is partially diagrammatic, side-elevational view of the apparatus of FIGS. 1 and 2.

As shown in FIGS. 1–3, the compact video system of the present invention includes a cart 10 having a lower housing 12 and an upper housing 14. Lower housing 12 is provided with a pair of wheels 16 at the rear thereof and a pair of swivel casters 18 and 20 at the front thereof. Wheels 16 and casters 18 and 20 permit movement of cart 10 over rough outdoor terrain so that the video system may be used in applications such as athletic events. Lower housing 12 has a compartment 22 for housing a battery 24. A lid 26, pivotable at pivot 28, covers compartment 22 to protect battery 24. Housing 12 is further provided with a compartment 30 for housing other components of the video system.

Upper housing 14 has a plurality of compartments 32, 34 and 36. Housed in compartment 32 is a portable video cassette recorder (VCR) 38 having a control panel 40 which is accessible when lid 42 is raised. An exemplary portable VCR is either the KODAK MVS-5000 Audio/Video Recorder or the KODAK MVS-3000 Video Recorder sold by the Eastman Kodak Company of Rochester, N.Y.

Compartment 36 houses a high speed video camera 44 such as, for example, the camera described in copending, commonly-assigned U.S. patent application Ser. No. 930,201, filing date 11-13-86 entitled A VARIABLE SPEED VIDEO CAMERA by Dean M. Peterson. Such a video camera is operable at continuously variable shutter speed to capture high speed events which are recorded on magnetic tape by VCR 38.

Mounted in compartment 34 is a video monitor 46 which has a picture tube 48 with an upwardly oriented face 50. An image displayed on tube 48 is viewable even in bright sunlight by means of mirror 52 mounted on lid 54. A glare screen 56. Glare screen 56 reduces the ambient secondary reflections from sunlight and other external sources so that the image on tube 48 may be viewed without substantial loss in image brightness.

Glare screen 56 is pivotally mounted to lid 54 by pivot 58 and cooperates with side panels 60 and 62 to minimize ambient light on face 50 of tube 48.

Whe lid 54 is closed, it may be locked by means of latch 64 and lock 65 to prevent unauthorized access to monitor 50 and VCR 40. Similarly, lid 66 is lockable when closed by means of lock 68 to prevent access to camera 44.

Upper housing 14 is movably mounted relative to lower housing 12 by means of arm assembly 70 which includes lower arms 72 secured to lower housing 12 and upper arms 74 and 76 which are telescoped over arms 72. A U-shaped handle 78 is provided for pushing cart 10 and for supporting a camera mount tripod 80 which supports camera 44 during video recording operations.

Figure 4:
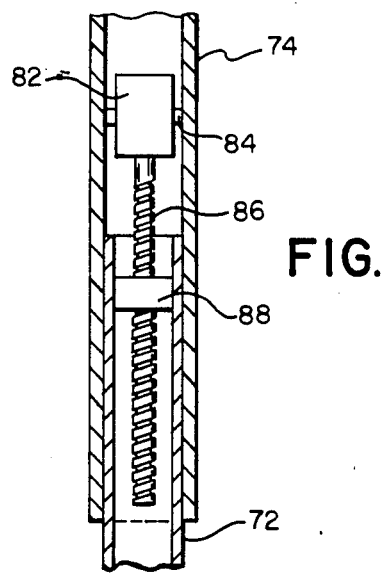
FIG. 4 is a sectional elevational view of the elevation mechanism of the embodiment of FIGS. 1 and 2.

Housing 14 is moved relative to housing 12 by means of a motor and screw power mechanism (see FIG. 4) which includes motor 82 mounted in upper arm 74 by mount 84 and a power screw 86 driven by motor 82 which is threaded into block 88 mounted in lower arm 72. A similar arrangement may be mounted in arm 76 and arm 77.

Mounted on the lower side of housing 12 is a brake 90 which is engageable with wheel 16 in order to prevent rotation of wheel 16 in and movement of cart 10. Brake 90 is actuated by brake solenoid 92 when housing 14 is lowered against housing 12 to engage microswitch 94. This prevents theft of cart 10 when it is collapsed and not in use.

Figure 5:
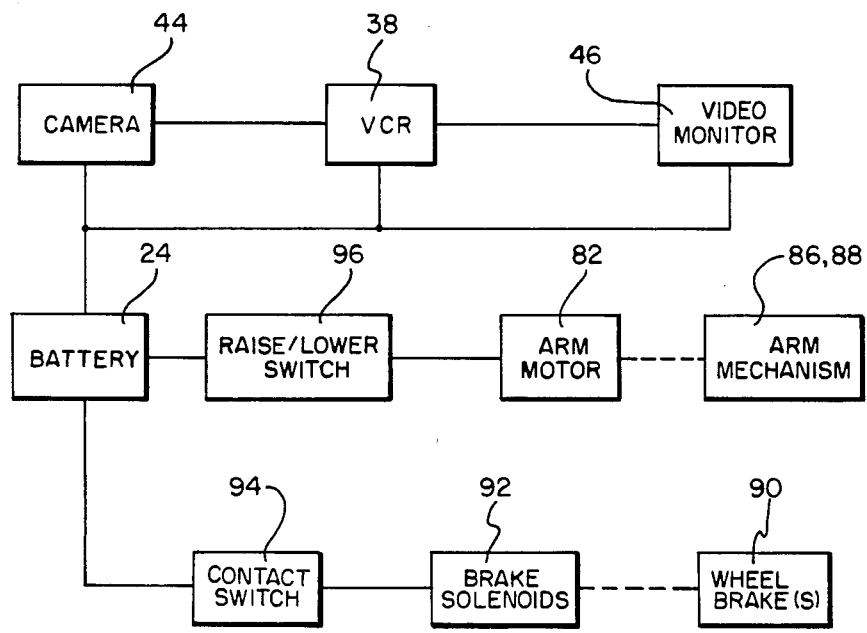
FIG. 5 is a block electrical diagram of the components of the apparatus of FIG. 1.

Referring now to FIG. 5, there is shown a block diagram of the video system of the present invention. As shown, camera 44, VCR 38 and video monitor 46 are interconnectable so that high speed events may be captured by camera 44 and either recorded on magnetic tape by VCR 38 or shown on video monitor 46. The high speed event recorded by VCR 38 may then be played back later on video monitor 46 at slow or stop motion in order to analyze the event captured by camera 44.

Battery 24 is connectable to camera 44, VCR 38, and monitor 46 to power them when they are mounted in cart 10. It will be understood that camera 44 and VCR 38 are portable and may be operated away from cart 10 so that a separate battery or power source (not shown) is provided for such operation.

A raise/lower switch 96 is mounted on housing 14 to control the lowering and raising of housing 14 relative to housing 12. By mounting camera 44 on camera mount 80, camera 44 may be raised and lowered during operation to position it for recording a scene.

The invention has been described in detail with particular reference to preferred embodiments thereof, but it will be understood that variations and modifications can be effected within the spirit and scope of the invention.

What is claimed is:

1. A compact video system comprising:
   a cart including a lower housing and a separate upper housing;
   wheel means mounted on said lower housing for moving said cart;
   means for adjustably supporting said upper housing relative to said lower housing;
   drive means associated with said support means for selectively driving said support means to raise and lower said upper housing relative to said lower housing;
   brake means cooperatively associated with said wheel means for locking said wheel means against rotation to prevent movement of said cart; and
   means for actuating said brake means to lock said wheel means when said upper housing is lowered into contact with said lower housing.

2. The video apparatus of claim 1 including a video monitor comprising a video monitor tube and means for supporting said video monitor in said upper housing such that the face of said video monitor tube is upwardly oriented;
   a lid movably mounted on said upper housing overlying said face of said video monitor tube;
   a mirror mounted on said lid facing said video monitor tube; and
   a glare screen mounted to said lid so that when said lid is raised, said glare screen and said mirror permit viewing of said monitor but prevent external reflections and glare from substantially diminishing the brightness of an image displayed on said video monitor.

3. The system of claim 2 wherein said upper housing further houses a video cassette recorder (VCR) connected to said monitor for displaying images produced from a tape inserted into said recorder, and wherein said lower housing houses a battery for providing power to said VCR and said monitor and wherein when said upper housing is lowered into contact with said lower housing, access to said battery is inhibited.

4. The system of claim 1 wherein said upper housing houses a removable high speed video camera and including means connected to said upper housing for supporting said camera such that raising and lowering of said upper housing by said drive means effects raising and lowering of said camera to position said camera for viewing a scene.

* * * * *